United States Patent [19]

Brockett

[11] Patent Number: 4,711,084
[45] Date of Patent: Dec. 8, 1987

[54] EJECTOR ASSISTED COMPRESSOR BLEED

[75] Inventor: Walter D. Brockett, North Haven, Conn.

[73] Assignee: Avco Corporation, Providence, R.I.

[21] Appl. No.: 318,302

[22] Filed: Nov. 5, 1981

[51] Int. Cl.⁴ .......................... F02C 6/18; F02C 3/00
[52] U.S. Cl. ............................. 60/39.07; 60/39.29
[58] Field of Search .......................... 60/39.07, 39.29

[56] References Cited

U.S. PATENT DOCUMENTS

| | | | |
|---|---|---|---|
| 2,625,009 | 1/1953 | Leggett et al. | 60/39.07 |
| 2,837,269 | 6/1958 | Torell | 60/39.29 |
| 3,487,993 | 1/1970 | Rannenberg | 60/39.07 |
| 3,631,672 | 1/1972 | Gentile et al. | 60/39.66 |
| 3,966,354 | 6/1976 | Patterson | 415/116 |

Primary Examiner—Louis J. Casaregola
Assistant Examiner—Donald E. Stout
Attorney, Agent, or Firm—Perman & Green

[57] ABSTRACT

Means are provided to enhance the bleed flow from a low pressure stage of a multi-stage compressor. An ejector nozzle is positioned in a passage connected to a bleed air reservoir. The reservoir is constructed to collect bleed air from the low pressure stage of the compressor. The nozzle is connected to a source of bleed air from a high pressure stage of the compressor.

1 Claim, 2 Drawing Figures

EJECTOR ASSISTED COMPRESSOR BLEED

BACKGROUND OF THE INVENTION

In any bleed system for a gas turbine engine, whether it is used to supply auxiliary power, cooling air, or for off design component matching, it is necessary that the bleed air be of sufficiently high pressure to insure a proper flow through the system. This requirement must be weighed against the loss in the engine performance which is caused by bleeding high pressure air. It is the purpose of this invention to provide a bleed system with increased bleed pressure by extracting bleed air, from a relatively low pressure stage of a multi-stage compressor, through an ejector using air from a higher pressure region of the compressor as the primary ejector air, thus improving the overall engine cycle performance at partial operating speeds.

SUMMARY OF THE INVENTION

This invention is primarily applicable to a gas turbine engine having multiple compressor stages. Bleed air is extracted through multiple apertures in the shroud of a low pressure compressor stage and collected in a reservoir surrounding the bleed apertures of the shroud. A supply passage directs bleed air from the reservoir to the desired component. An ejector nozzle is positioned in the supply passage to introduce a high pressure primary flow into the passage and draw, as a secondary flow, the relatively low pressure bleed air from the reservoir. The nozzle obtains its high pressure air from a high pressure stage of the compressor. It is the nature of an ejector that only a relatively minor amount of high pressure bleed air is needed to power the low pressure bleed system. When the engine is operating at design speeds, generally the bleed system will not need the ejector power and the high pressure supply can be shut down.

DESCRIPTION OF THE DRAWING

The invention is described in more detail below with reference to the attached drawing in which.

DETAILED DESCRIPTION OF THE PREFERRED EMBODIMENT

Figure 1:
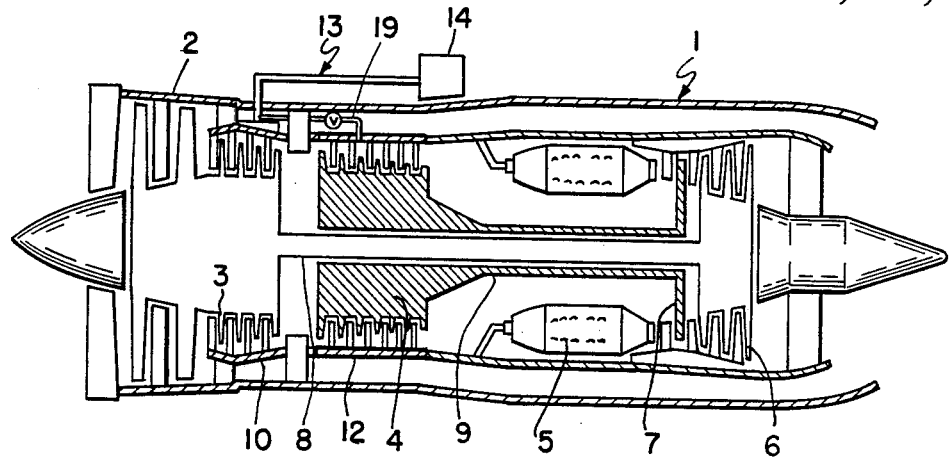
FIG. 1 is a schematic diagram of a gas turbine engine having a multi-stage compressor.

A typical turbofan gas turbine engine 1 is schematically illustrated in FIG. 1. Engine 1 is mounted in nacelle 2 and employs dual compressor stages consisting of low pressure rotor 3 and high pressure rotor 4. These rotors are powered by turbines 6 and 7 respectively through drive shafts 8 and 9. High energy airflow is supplied to turbines 6 and 7 through combustor 5.

Compressor rotor 3 is surrounded by a cylindrical shroud 10 and compressor rotor 4 is enclosed by cylindrical shroud 12. The bleed system 13 is shown interconnecting the high and low pressure stages.

Figure 2:
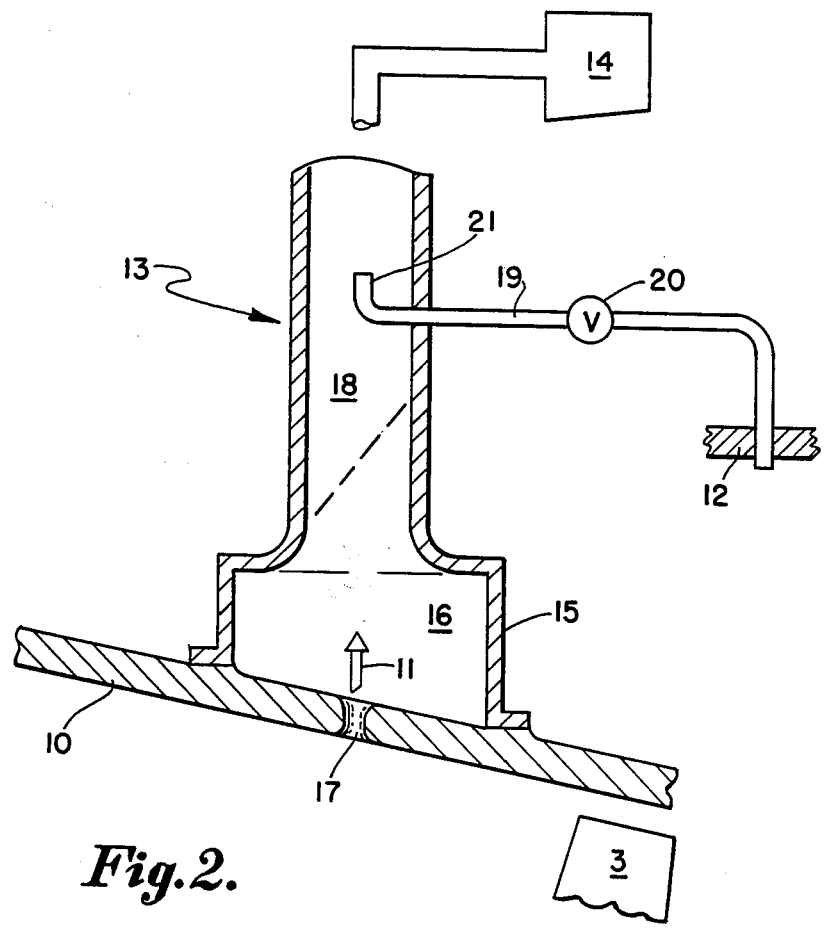
FIG. 2 is a schematic diagram of a bleed system according to this invention.

Bleed system 13 is shown in more detail in FIG. 2. A manifold 15 is mounted on shroud 10 and forms an interior reservoir 16. A bleed aperture 17 is constructed in shroud 10 to allow compressor air to flow into reservoir 16 as indicated by arrow 11. It may be desirable to construct manifold 15 in an annular configuration around the periphery of shroud 10 and construct a plurality of bleed apertures 17. Manifold 15 is constructed with outlet passage 18 to extract air from the reservoir 16 and direct it to accessories, such as, cooling systems 14 or otherwise discharged, as is well known.

An ejector nozzle 21 is positioned within outlet passage 18 to direct a stream of high pressure air away from the reservoir 16. Nozzle 21 is connected to a bleed pipe 19 which communicates with high pressure compressor stage 4 through a control valve 20. High pressure air is extracted through a bleed aperture in the shroud 12. The valve 20 may be designed to shut off the ejector flow when the engine 1 is operating at standard speed and to be open when the gas turbine engine 1 is in idle, start-up, shut-down, or partial speed operation.

In operation the high pressure primary flow from compressor 4 is ejected from nozzle 21. This flow tends to draw secondary airflow in the surrounding outlet passage 18 and accelerate the extraction of bleed air from reservoir 16 and low pressure compressor stage 3. In this manner a significant amount of bleed airflow can be maintained at all levels of operation of engine 1, while minimizing the pressure losses in the compressor stages.

I claim:

1. Apparatus for bleeding air from a low pressure stage of a multi-stage compressor in a gas turbine engine comprising:

a shroud surrounding the low pressure compressor stage, said shroud being constructed with at least one bleed aperture;

a manifold mounted on the shroud and enclosing a reservoir communicating with the bleed aperture, said manifold having at least one outlet passage communicating with said reservoir;

an ejector nozzle mounted in the outlet passage of the manifold in a direction away from the manifold, said nozzle being connected to a source of bleed air from a high pressure compressor stage of the gas turbine engine, said nozzle being constructed and positioned within the outlet passage to draw air from the reservoir when high pressure bleed air flows from the nozzle; and means controlling the flow of high pressure bleed air through the nozzle.

* * * * *